W. A. L. MILLER.

Manufacture of Cabinet Jewelry.

No. 9,723. Reissued May 24, 1881.

Witnesses

Geo. H. Strong

Frank A. Brooks

Inventor

William A. L. Miller

By Dewey & Co. Attys

N. PETERS, Photo-Lithographer, Washington, D. C.

UNITED STATES PATENT OFFICE.

WILLIAM A. L. MILLER, OF SAN FRANCISCO, CALIFORNIA.

MANUFACTURE OF CABINET JEWELRY.

SPECIFICATION forming part of Reissued Letters Patent No. 9,723, dated May 24, 1881.

Original No. 198,207, dated December 18, 1877. Application for reissue filed May 2, 1881.

*To all whom it may concern:*

Be it known that I, WILLIAM A. L. MILLER, of the city and county of San Francisco, State of California, have invented Improvements in Cabinet Jewelry; and I hereby declare the following to be a full, clear, and exact description thereof.

My invention relates to an improvement in the manufacture of what is known as "cabinet jewelry," a style of jewelry in which the ornamentation consists in filling a cavity in the face of the article with purely-divided particles of ore or other substances and covering it with a transparent cover or face.

The method heretofore employed in manufacturing this class of jewelry has been to fill the compartments with the particles of ore or other substance from the front of the article to be ornamented and then secure the glass cover or face over them. By this method it was impossible to prevent the particles from shifting their position, so that the dust produced by constant friction of one particle against another would settle upon the under side of the glass and mar the brilliancy of the jewelry. This friction also wore away the particles and was liable to scratch the glass.

My improvements consist in fixing the glass cover or face in position and filling the particles into the cavities with a cement or putty over the under side of the compartments, so as to press the front particles snugly against the glass, and fix them immovably when the glass is in place. If the article of jewelry to be ornamented is hollow I can secure the glass in place and fill the glass and apply the putty from the inside; but if the article of jewelry is solid I make a cavity in the face to be ornamented, and then construct a small frame to fit in this cavity. In the frame I place the compartments, glass cover, and particles, secure the particles with putty or cement, and then set the frame in the cavity.

Figure 1:
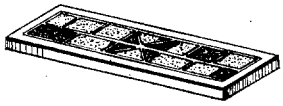
Figure 2:
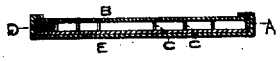

In the accompanying drawings, Fig. 1 is a perspective view. Fig. 2 is a cross-section.

In the present instance I have represented a frame, A, fitting into a corresponding cavity in the face of the article B which is to be ornamented. The interior of this frame I divide into compartments of any desired shape by means of partitions or cross-partitions C, in which to place the ore. I then place the glass or other transparent cover over the outside face and secure it in place, after which I fill in the particles D into the compartments from the back or open side to the required depth. After the particles have been arranged I take a small piece of putty or other cement, E, and spread it over the rear open side of the frame, so as to cover the particles, cement them together, and thus hold them immovably in place. The pressure required to spread the putty or other cement will press the particles close to the glass, so that they will not shift or move from position.

I prefer to use putty for cementing the particles, because it is easily spread and molded when fresh, but will form a hard, immovable back after it becomes dry. It is not affected by heat, cold, or dampness, and does not shrink in drying, but can be easily removed when desired.

Having thus described my invention, what I claim, and desire to secure by Letters Patent, is—

The improvement in the manufacture of cabinet jewelry, consisting in the application of putty or other cement to the back of the compartments to retain the particles of ore or other substance in position, substantially as specified.

In witness whereof I have hereunto set my hand.

WILLIAM A. L. MILLER.

Witnesses:

S. H. NOURSE,

FRANK A. BROOKS.